Aug. 4, 1953  H. TROEGER ET AL  2,647,380
FLEXIBLE SHAFT
Filed June 24, 1949  2 Sheets-Sheet 1
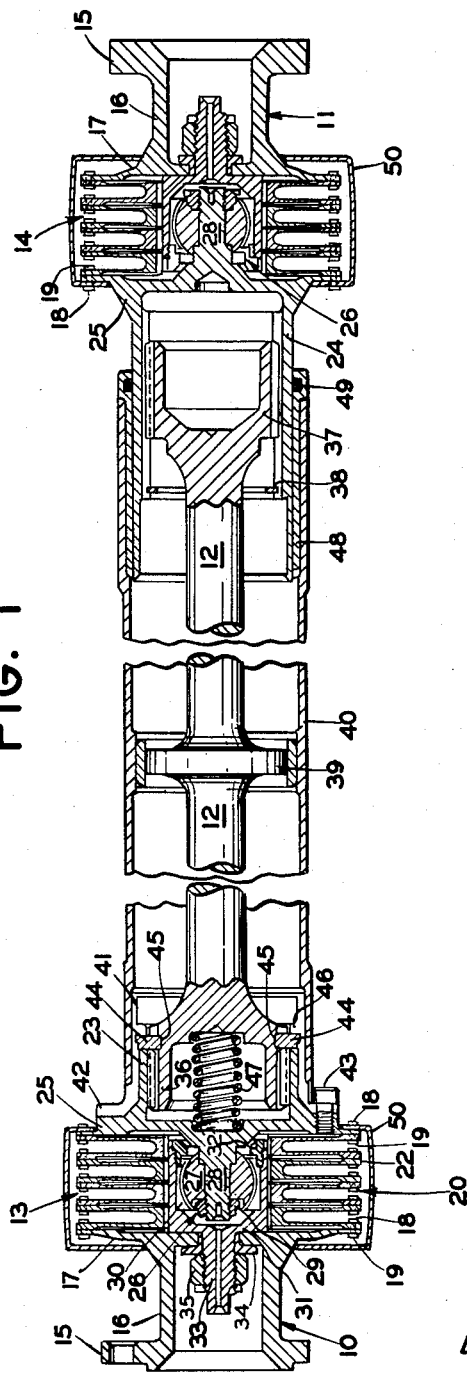
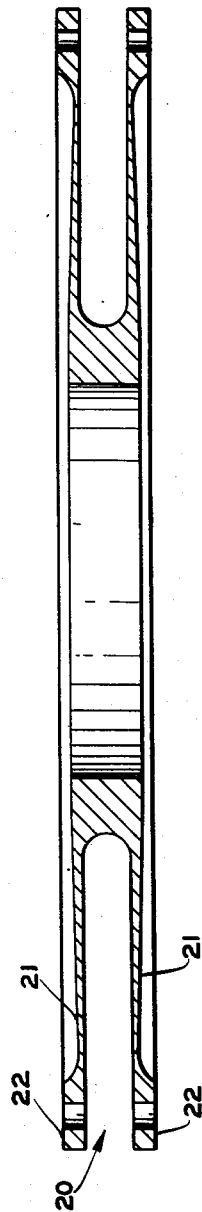
INVENTORS
HENRY TROEGER
BERNARD W. GOLDBERG
BY
ATTORNEY

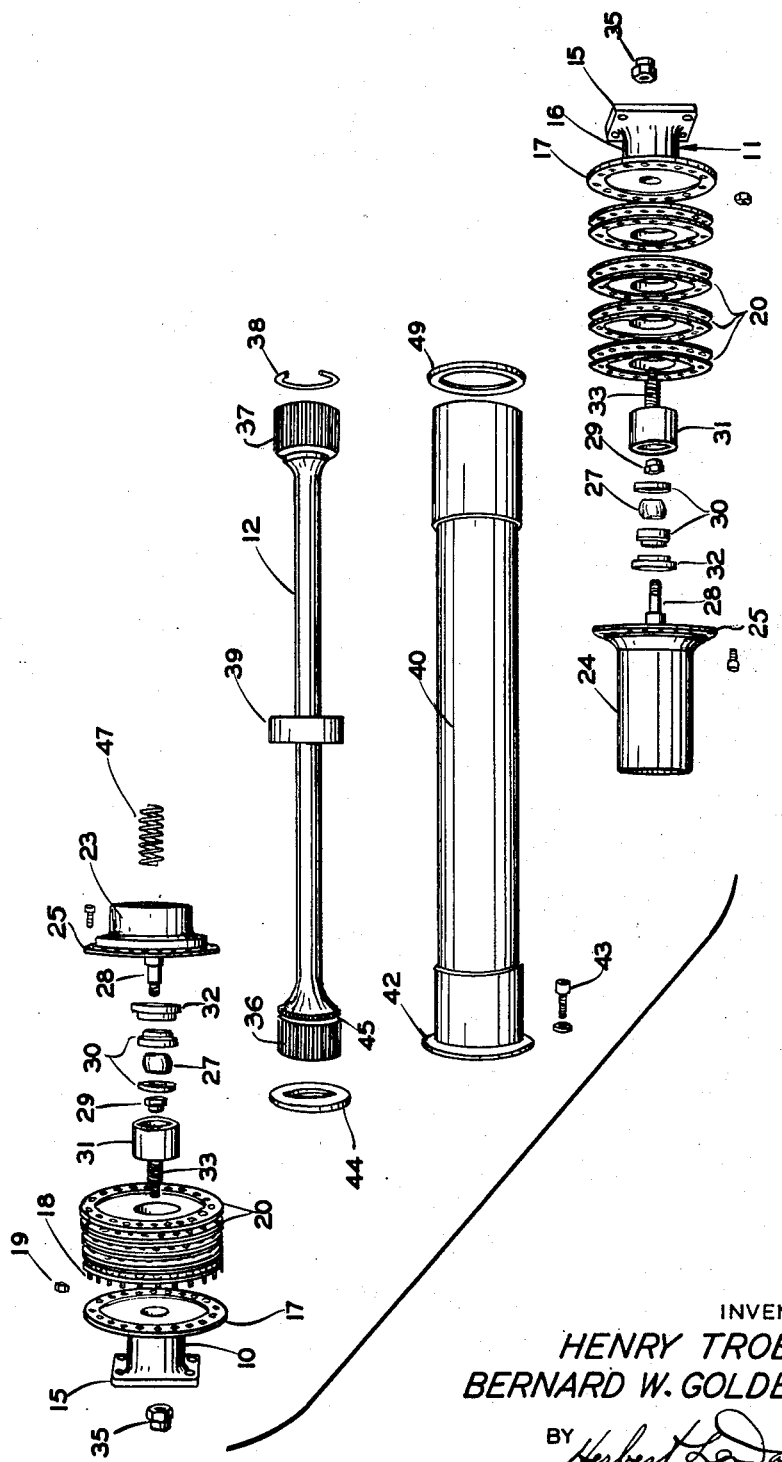

Patented Aug. 4, 1953

2,647,380

UNITED STATES PATENT OFFICE 2,647,380

FLEXIBLE SHAFT

Henry Troeger, Ramsey, and Bernard W. Goldberg, Passaic, N. J., assignors to Bendix Aviation Corporation, Teterboro, N. J., a corporation of Delaware Application June 24, 1949, Serial No. 101,228

2 Claims. (Cl. 64—13)

This invention relates to flexible couplings and in particular to couplings permitting both angular and axial misalignment.

The purpose of the invention is to provide a universal drive shaft to transmit torque between shafts having fixed or varying misalignment at high speeds and subject to vibrations.

It is an object of this invention to provide an improved flexible coupling between shafts having a fixed or varying misalignment.

Another object is to provide a flexible coupling having substantially uniform stresses throughout the flexible member.

Another object is to provide an improved flexible coupling permitting axial deflection.

Another object is to provide a flexible coupling that will "fail safe."

Another object is to provide a flexible coupling in which shaft whip is minimized.

Another object is to provide a universal drive shaft which is particularly suited to the transmission of torque at high speed under misalignment and vibration conditions encountered in aircraft or similar installations.

The above and other objects and features of the invention will appear more fully hereinafter from a consideration of the following description taken in connection with the accompanying drawings wherein one embodiment of the invention is illustrated by way of example.

In the drawings:

Figure 1 is a longitudinal cross section view of a coupling embodying the invention.

Figure 2 is a sectional view of a flexible diaphragm utilized in the invention.

Figure 3 is an exploded view of the coupling illustrated in Figure 1.

Referring to the drawings wherein like reference characters indicate like parts in the figures, there is shown in Figures 1 and 3, a flexible coupling comprising, in general, a driving member 10, a driven member 11, a quill shaft 12, and a pair of flexible diaphragm assemblies 13 and 14 for connecting the members 10 and 11 to the respective ends of the shaft 12.

The members 10 and 11 as illustrated are similar. Each has a flange 15 adapted to be secured to mating members of driving and driven elements (not shown), a tubular section 16 and a circumferential flange 17. One end of the diaphragm assemblies 13 and 14 is fastened to the respective flanges 17 of the members 10 and 11 by means of screws 18 and nuts 19.

The diaphragm assemblies 13 and 14 each comprises a plurality of substantially annular U-shaped members 20. The diaphragm members 20 have dual-flanged members 21, see Figure 2, each having a circumferential flange 22 of substantially uniform thickness and walls whose thickness decreases with increasing radial distance from the center so that uniform torsional shear stress due to torque is maintained throughout and substantially uniform bending stress occurs in the plane of flexure. A plurality of diaphragms are secured together to form a unitary structure by fastening the adjacent flanges together by means of screws 18 and lock nuts 19 or other suitable means. The number of diaphragms used in an assembly may vary from one to several depending upon load conditions.

The diaphragm assemblies 13 and 14 are connected for torque transmission to the shaft 12 by means of splined flange 23 and long splined flange 24. The splined flanges 23 and 24 are somewhat similar with the exception that the splined flange 24 has a substantially longer splined portion. The flanges 23 and 24 each have a shoulder portion 25 of substantially the same diameter as the diaphragms 20 and are adapted to be secured to the flange 22 by means of screws 18 and lock nuts 19 or other suitable means.

In order to provide for greater rigidity of the complete joint as well as to provide safety in the case of a failure of one of the diaphragms 20 the splined flanges 23 and 24 are supported by the members 10 and 11 through means of knuckle joints 26, arranged in the following manner, as indicated in detail at the left of Figure 1. A spherical ball 27 is locked in place on an axially extending threaded portion 28 of the flanges 23 and 24 by means of a nut 29. The ball 27 is seated in spherical bushings 30 which are positioned in a bearing housing 31 by means of a bearing retainer nut 32. The bearing housing 31 has an axially extending threaded portion 33 adapted to be secured to the flange 17 of the members 10 and 11 by means of a bushing 34 and a nut 35. In order that the center of gravity of the shaft be in the plane of rotation the portion 33 has a slight eccentricity with respect to the bearing housing 31 and the outer diameter of the bushing 34 has a slight eccentricity relative to its inner diameter. By rotating the portion 33 of the housing 31 and the bushing 34 relative to each other the center of gravity or balance of the shaft can be shifted into the plane of rotation. In normal operation, the knuckle joint 26 merely wobbles about the ball 27. However, should a failure occur in one of the diaphragms the members 10 and 11 would be constrained to rotate about the ball.

The quill shaft 12 is a long thin member designed to absorb torque surges by twisting and deforming torsionally. The ends of the shaft 12 terminate in expanded splined portions 36 and 37 adapted to mate with the splined flanges 23 and 24 respectively. The splined portion of the member 24 is substantially greater than that of the portion 37 thus permitting axial movement of the shaft 12 to allow for variations in the distances between the members 10 and 11. A retaining ring 38 serves merely to prevent the splined flange 24 from sliding out of mesh while the coupling is being handled or installed.

In order to minimize the possibility of the quill shaft 12 whipping at high speeds and at the same time retain the torsional deforming characteristics, the shaft 12 is fitted with a pilot bearing 39 which may rotate in a tube 40. One end of the tube 40 is fastened to the splined flange 23 by means of a liner 41, having an outward extending section 42, shrunk in the tube 40. The outward extending section 42 is secured to the shoulder portion 25 of the splined flange 23 by means of screws 43. The splined portion 36 of the shaft 12 is locked into position with the splined flange 23 by a split ring 44 fitted in a circumferential groove 45 on the splined portion 36 and held against a shoulder 46 of the liner 40 by a spring 47 interposed between shaft 12 and the flange 23 so as to provide a resilient coupling between flange 23 and shaft 12.

The other end of the tube 40 is fitted with a bearing liner 48 which permits the tube 40 to slide and oscillate on the long splined flange 24. The outer end of the liner 48 is adapted to receive an O-ring seal 49 for sealing the lubrication within the tube 40 and also acts to dampen vibration of the tube 40 with the flange 24.

While only one pilot bearing is shown it is understood that more than one may be used. The number to be used will depend upon the design of the shaft and will normally be increased with increased length of the shaft.

In order to protect the diaphragms 20 from external damage a cover 50 is provided for the assemblies 13 and 14.

In operation the diaphragm assemblies 13 and 14 provide the flexibility necessary to overcome the angularity due to any misalignment and vibration. The knuckle joints 26 provide greater rigidity for the complete coupling without destroying any of its flexible characteristics. Also should one of the diaphragms fail the driving member would merely rotate around the ball of the knuckle joint thus preventing damage as the shaft would be retained by the joint. The tube 40 imparts a desired lateral stiffness to the quill shaft 12 without affecting its torsionally twisting and deforming characteristics. The long splined flange 24 permits the splined portion 37 to slide axially therein to allow for variations in the distance between the driving and driven flanges.

While the flexible coupling has been designated as having a driving and a driven member, it can readily be seen that the coupling can be reversed hence it is immaterial as to which is the driving or driven end.

Although only one embodiment of the invention has been illustrated and described, various changes in the form and relative arrangements of the parts may be made to suit requirements.

What is claimed is:

1. A flexible coupling for the transmission of torque comprising a driving member having a substantially annular flange, a plurality of annular U-shaped discs serially connected at their outer edge, means connecting the outer disc at its outer edge to said annular flange, a driven member having a substantially annular flange, means connecting the inner disc at its outer edge to said second annular flange, means including a knuckle joint supporting said driven member with said driving member, said knuckle joint having one portion secured to said driving member and another portion secured to said driven member, and means for adjusting said knuckle joint to balance said driven member in respect to the axis of rotation of said driving member, said means comprising an eccentric portion of said knuckle joint extending through and cooperating with an eccentric bushing in said driving member and rotative relative thereto.

2. A flexible coupling for the transmission of torque comprising a driving member, a driven member, a flexible diaphragm member for rotatably connecting said driving and driven members, separate means including a knuckle joint for supporting and preventing axial movement of said driven member relative to said driving member, and means for adjusting said knuckle joint for varying the relative position of said driving and driven members, said means including an axially extending member of said knuckle joint and being eccentric relative thereto, a bushing in said driving member having an outside diameter eccentric relative to the inside diameter and rotatable relative to said axially extending member.

HENRY TROEGER.
BERNARD W. GOLDBERG.

References Cited in the file of this patent

UNITED STATES PATENTS

| Number | Name | Date |
|---|---|---|
| 1,183,064 | Emerson | May 16, 1916 |
| 1,273,963 | Watts | July 30, 1918 |
| 1,639,480 | Baumann | Aug. 16, 1927 |
| 1,871,227 | Smith et al. | Aug. 9, 1932 |
| 1,893,452 | Standage | Jan. 3, 1933 |

FOREIGN PATENTS

| Number | Country | Date |
|---|---|---|
| 11,704 | Great Britain | 1905 |
| 459,084 | Great Britain | 1937 |
| 564,963 | Great Britain | 1944 |